United States Patent [19]

Wamprecht et al.

[11] Patent Number: 5,280,072
[45] Date of Patent: Jan. 18, 1994

[54] EPOXIDE AND ANHYDRIDE GROUPS-CONTAINING COPOLYMER WITH POLYOL

[75] Inventors: Christian Wamprecht, Neuss; Hans-Joachim Kreuder, Toenisvorst; Josef Pedain, Cologne, all of Fed. Rep. of Germany

[73] Assignee: Bayer Aktiengesellschaft, Leverkusen, Fed. Rep. of Germany

[21] Appl. No.: 879,251

[22] Filed: May 5, 1992

[30] Foreign Application Priority Data

May 11, 1991 [DE] Fed. Rep. of Germany ....... 4115495

[51] Int. Cl.$^5$ .................. C08L 33/14; C08L 75/02; C08L 75/04; C08L 67/02
[52] U.S. Cl. ................. 525/207; 525/128; 525/131; 525/148; 525/176; 525/187; 525/934
[58] Field of Search ............ 525/207, 128, 131, 148, 525/176, 187, 934

[56] References Cited

U.S. PATENT DOCUMENTS

| | | | |
|---|---|---|---|
| 3,784,396 | 1/1974 | Fourment et al. | 117/21 |
| 3,914,333 | 10/1975 | Labana et al. | 525/207 |
| 3,991,132 | 11/1976 | Siwiec et al. | 260/836 |
| 3,991,133 | 11/1976 | Siwiec et al. | 260/836 |
| 4,069,275 | 1/1978 | Labana et al. | 260/836 |
| 4,101,606 | 7/1978 | Cenci et al. | 260/857 UN |
| 4,442,145 | 4/1984 | Probst et al. | 427/385.5 |
| 4,861,841 | 8/1989 | Marrion | 525/327.3 |

FOREIGN PATENT DOCUMENTS 73022 3/1983 European Pat. Off. .
473999 3/1992 European Pat. Off. .
52-069936 6/1977 Japan .

OTHER PUBLICATIONS

Chem Abstract 88(12):75374a.
Detroit Society for Paint Technology, "Ponder Coating: Why-How-When," Journal of Paint Technology, vol. 44, No. 565, Feb. 1972, pp. 30-37.

Primary Examiner—Robert E. Sellers
Attorney, Agent, or Firm—Joseph C. Gil; Thomas W. Roy

[57] ABSTRACT

The present invention relates to coating compositions in pulverulent form which are solid below 30° C. and liquid above 150° C. and contain A) 10 to 99 parts by weight of a copolymer component containing at least one copolymer which is prepared from olefinically unsaturated compounds, has a weight average molecular weight of 1500 to 75,000 and contains in chemically bound form (i) 1 to 30% by weight of cyclic carboxylic acid anhydride groups (calculated as $C_4H_2O_3$) and
  (ii) 0.3 to 10% by weight of epoxide groups (calculated as $C_2H_3O$), and B) 1 to 90 parts by weight of a polyol component containing at least one organic polyol having at least two hydroxyl groups per molecule, provided that for every anhydride group of component A) there are 0.1 to 10 hydroxyl groups of component B).

11 Claims, No Drawings

EPOXIDE AND ANHYDRIDE GROUPS-CONTAINING COPOLYMER WITH POLYOL

BACKGROUND OF THE INVENTION

1. Field of the Invention

This invention relates to powder coating compositions which are solid at temperatures below 30° C. and liquid above 150° C. and which are based on A) copolymers containing carboxylic acid anhydride groups and epoxide groups and B) polyhydroxyl compounds.

2. Description of the Prior Art

It is known to use compositions containing polyacrylates having at least two carboxyl groups per molecule and polyepoxide compounds, optionally based on acrylates, as powder lacquers. Japanese Patent Application 73-9,319 (Publication number: 49-116,134; Chem. Abs. 82(24):157882e) describes heat curable powder coating compositions containing A) a solid acrylate resin prepared by the reaction of a hydroxyl group-containing copolymer with a polycarboxylic acid or its anhydride and B) an epoxide group-containing copolymer. The two polymers are mixed together as melts at temperatures of about 100° C. and the mixtures are ground up after cooling. The coatings may be applied to metal surfaces and hardened at temperatures of about 200° C.

DE-OS 23 47 680 describes heat curable powder lacquers containing A) 50 to 97% of an epoxide group-containing copolymer having a molecular weight of 3,000 to 15,000 and a softening point of 80° to 150° C. and B) 3 to 50% of a carboxyl group-containing hardener having a softening point of at least 50° C., wherein the hardener may be a copolymer containing carboxyl groups.

Japanese Patent Application 75-146,705 (Publication Number: 52-069,936; Chem. Abs. 88(12):73374a) describes heat curable powder lacquers based on glycidyl (meth)acrylate copolymers containing A) 100 parts of a copolymer (T 30° to 100° C., molecular weight 3,000 to 70,000) containing 10 to 50% by weight of glycidyl(meth)acrylate, 30 to 85% by weight of acrylic acid $C_1$-$C_{12}$-alkyl esters and 0 to 60% by weight of another comonomer, B) 0.1 to 30 parts of a copolymer which regulates flow properties ($T_g$ > 50° C., molecular weight > 1000), containing 30 to 85% by weight of (meth)acrylic acid alkyl esters, 1 to 50% by weight of a monomer having a glycidyl, carboxyl, hydroxyl or amide group and 0 to 69% by weight of another monomer and C) 3 to 55 parts of an aliphatic dicarboxylic acid having 4 to 20 carbon atoms. The lacquers adhere firmly to metals without previous surface treatment.

U.S. patent Ser. No. 3,991,132 and U.S. patent Ser. No. 3,991,133 describe heat curable powder lacquers obtained from A) an epoxide-containing copolymer containing 5 to 20% of glycidyl methacrylate and 80 to 95% of other comonomers ($T_g$ 40° to 90° C., molecular weight 1500 to 15,000) and B) an anhydride cross-linking agent, either a dicarboxylic acid anhydride or a dicarboxylic acid anhydride homopolymer, provided that the copolymer is difunctional. In U.S. patent Ser. No. 3,991,132 the copolymer is synthesized from at least 2 to 10% of an unsaturated acid amide and in U.S. patent Ser. No. 3,991,133 the copolymer is synthesized from at least 2 to 10% of a $C_5$-$C_7$- hydroxyalkyl(meth)acrylate in addition to 70 to 93% of other comonomers such as methyl or butyl methacrylate, styrene or vinyl toluene. Further, a quantity of the anhydride hardeners is replaced by a hydroxycarboxylic acid so that 0.1 to 0.4 carboxyl groups of the hydroxycarboxylic acid are present for every functional group of the copolymer.

It is also known to use components containing anhydride groups with components containing hydroxyl groups as powder lacquers. Lacquer systems of this type are described in U.S. Pat. Nos. 4,069,275 and 4,101,606, British Patents Nos. 1 366 081 and 1 561 828 and European Patent Applications Nos. 73 022 and 209 377. Such powder lacquers are normally hardened at temperatures of 130° to 200° C., but it has been found that the cross-linking reactions do not proceed to completion at relatively low temperatures, e.g., 130° to 160° C., so that the solvent resistance of the lacquer films obtained is not sufficient. it is only at hardening temperatures of 170° to 200° C. that lacquer films with acceptable solvent resistance are obtained.

In none of the previously described publications are copolymers containing both cyclic carboxylic acid anhydride groups and epoxide groups described as binders or powder lacquers.

It has now surprisingly been found that copolymers of olefinically unsaturated compounds containing both cyclic carboxylic acid anhydride groups and epoxide groups in the same macromolecule are excellent binders for powder lacquers when used in combination with polyels if they have the required softening point or range. The special advantage of such binder compositions is that they enable solvent-resistant lacquer films to be obtained at low stoving temperatures, e.g., at 130° to 150° C.

Another advantage lies in the fact that initially component A) does not contain free carboxyl groups which are required for cross-linking with the epoxide groups of component A). The required carboxyl groups are subsequently formed by the reaction of the carboxylic acid anhydride groups of component A) with the hydroxyl groups of component B). These new binder compositions therefore have considerably better storage stability at room temperature than comparable state of the art systems containing carboxyl groups.

Due to the high cross-linking densities which may be obtained, powder coatings having a very high level of chemical and solvent resistance can be obtained from the binder compositions according to the invention.

The binder compositions according to the invention therefore on the one hand have excellent storage stability at room temperature or at moderately elevated temperatures below their softening range and on the other hand result in coatings having excellent properties.

SUMMARY OF THE INVENTION

The present invention relates to coating compositions in pulverulent form which are solid below 30° C. and liquid above 150° C. and contain A) 10 to 99 parts by weight of a copolymer component containing at least one copolymer which is prepared from olefinically unsaturated compounds, has a weight average molecular weight of 1500 to 75,000 and contains in chemically bound form (i) 1 to 30% by weight of cyclic carboxylic acid anhydride groups (calculated as $C_4H_2O_3$) and (ii) 0.3 to 10% by weight of epoxide groups (calculated as $C_2H_3O$), and B) 1 to 90 parts by weight of a polyol component containing at least one organic polyol having at least two hydroxyl groups per molecule, provided that for every anhydride group of component A) there are 0.1 to 10 hydroxyl groups of component B).

DETAILED DESCRIPTION OF THE INVENTION

German Patent Application P 4 027 609.0 (which corresponds to copending application U.S. Ser. No. 07/748,297, filed Aug. 21, 1991) is directed to compositions containing A) copolymers having both cyclic carboxylic acid anhydride groups and epoxide groups and B) polyols, but these binder compositions are used exclusively as binders for liquid, in particular solvent-containing lacquers. The copending application does not disclose the possibility of using such or similar compositions as binders for powder coating compositions.

In the context of the present invention "pulverulent compositions" means both mixtures of pulverulent copolymers A) with pulverulent polyhydroxyl compounds B) and "mixed powders" in which the individual powder particles already contain the individual components A) and B). The auxiliary agents and additives C) optionally used may be present as separate component in the mixture or they may have been incorporated in the pulverulent binder compositions AB or the pulverulent binder components A) and/or B) during preparation of the binder compositions or components.

The compositions to be used according to the invention are solid below 30° C., preferably below 35° C., and liquid above 150° C., preferably above 120° C.

Copolymer component A) contains at least one copolymer containing both cyclic carboxylic acid anhydride groups (calculated as $C_4H_2O_3$) in a quantity of I to 30% by weight, preferably 5 to 25% by weight, and chemically incorporated epoxide groups (calculated as $C_2H_3O$) in a quantity of 0.3 to 20% by weight, preferably 1 to 15% by weight. The copolymers have a weight average molecular weight ($M_w$, as determined by gel permeation chromatography using polystyrene as standard) of 1,500 to 75,000, preferably 2,000 to 60,000 and more preferably 3,000 to 40,000.

The copolymers are based on monomers which are preferably monoolefinically unsaturated. Three groups of olefinically unsaturated monomers may be used for the preparation of the copolymers, i.e.:

a) olefinically unsaturated monomers containing anhydride groups, b) olefinically unsaturated monomers containing epoxide groups and c) non-functional olefinically unsaturated monomers which are free from anhydride groups and epoxide groups.

Monomers a) are generally used in a quantity of 1 to 30 parts by weight, preferably from 5 to 25 parts by weight; monomers b) in a quantity of 1 to 66 parts by weight, preferably 3 to 50 parts by weight; and monomers c) in a quantity of 4 to 98 parts by weight, preferably 25 to 92 parts by weight, wherein the sum of the parts by weight of a) to c) add up to 100.

In the context of the present disclosure, the proportions of the individual monomers in the mixture to be copolymerized are calculated so that the copolymers contain the above mentioned quantities of chemically incorporated anhydride groups and epoxide groups. The quantity of these groups present in the copolymers corresponds to the quantity of the same groups present in the monomer mixture since it is assumed that the copolymers correspond in their chemical composition to the chemical composition of the monomer mixture.

Monomers a) are mono-olefinically unsaturated carboxylic acid anhydrides such as maleic acid anhydride or itaconic acid anhydride. Maleic acid anhydride is preferred.

Monomers b) are mono-olefinically unsaturated epoxides such as glycidyl acrylate, glycidyl methacrylate and allyl glycidyl ether. The former two are preferred.

Monomers c) preferably have a molecular weight of 86 to 400. They are non-functional, preferably mono-olefinically unsaturated monomers which are free from anhydride groups and epoxide groups and include the monomers disclosed in the previously mentioned references. Examples include esters of acrylic and methacrylic acid such as methyl acrylate, ethyl acrylate, n-butyl acrylate, isobutyl acrylate, tert.-butyl acrylate, 2-ethylhexyl acrylate, cyclohexyl methacrylate, methyl methacrylate, n-butyl methacrylate, isobutyl methacrylate and 2-ethyl hexyl methacrylate; aromatic vinyl compounds such as styrene, vinyl toluene, α-methylstyrene, α-ethylstyrene and diethylstyrenes, isopropylstyrenes, butylstyrenes and methoxystyrenes which are substituted in the nucleus and may optionally be in the form of isomeric mixtures; vinyl ethers such as ethyl vinyl ether, n-propyl vinyl ether, isopropyl vinyl ether, n-butyl vinyl ether and isobutyl vinyl ether; and vinyl ester such as vinyl acetate, vinyl propionate and vinyl butyrate.

Mixtures of monomers a) to c) may also be used for the copolymerization, provided that the monomers used for the preparation of the copolymers are chosen so that the resulting copolymers are solid at temperatures below 30° C. al,. at temperatures above 150° C. This means that the copolymers have a glass transition temperature, T. of 30° to 100° C., preferably 35° to 80° C., as determined by differential thermoanalysis (DTA). This requirement for the glass transition temperature is fulfilled if a suitable ratio of "plasticizing" monomers (which lower the glass transition temperature of the copolymers) to "hardening" monomers (which raise the glass transition temperature) are used in the preparation of the copolymers.

Examples of "plasticizing" monomers include alkyl esters of acrylic acid such as methyl acrylate, ethyl acrylate, n-butyl acrylate, isobutyl acrylate, 2-ethylhexyl acrylate, lauryl acrylate and ethyl diglycol acrylate; vinyl esters such as vinyl propionate; and vinyl ethers such as vinyl methyl ether, vinyl ethyl ether, vinyl propyl ether, vinyl isobutyl ether, vinyl octadecyl ether and vinyl cyclohexyl ether.

Examples of "hardening" monomers include alkyl esters of methacrylic acid such as methyl methacrylate, ethyl methacrylate, isobutyl methacrylate, cyclohexyl methacrylate, 2-phenyl ethyl methacrylate, tetrahydrofurfuryl methacrylate, isopropyl methacrylate, tert.-butyl methacrylate, neopentyl methacrylate, isobornyl methacrylate and benzyl methacrylate; aromatic vinyl compounds such as styrene, vinyl toluene and α-ethyl styrene; and heterocyclic vinyl compounds such as vinyl pyrrolidone, vinyl caprolactam and vinyl carbazole.

The copolymers may be prepared by copolymerization of the above exemplified monomers a) to c) by conventional radical polymerization processes such as solvent-free or solution polymerization. In these processes, the monomers are copolymerized in the presence of radical formers and optionally molecular weight regulators at temperatures of 60° to 160° C., preferably 80° to 150° C.

The copolymers are preferably prepared in inert solvents. Suitable solvents include aromatic compounds such as benzene, toluene and xylene; esters such as ethyl acetate, butyl acetate, hexyl acetate, heptyl acetate, methyl glycol acetate, ethyl glycol acetate and methoxy propyl acetate; ethers such as tetrahydrofuran, dioxane and diethylene glycol dimethylether; and ketones such as acetone, methyl ethyl ketone, methyl isobutyl ketone, methyl-n-amyl ketone and methyl isoamyl ketone. Mixtures of these solvents may also be used.

Preparation of the copolymers may be carried out continuously or discontinuously. The monomer mixture and the initiator are generally introduced continuously at a uniform rate into a polymerization reactor and the corresponding quantity of polymer is removed continuously at the same time. Copolymers which are substantially chemically uniform may advantageously be produced by this method. Copolymers of this type may also be prepared by introducing the reaction mixture at a constant rate into a stirred vessel without removal of the polymer. Alternatively, part of the monomers may be introduced into the reaction vessel, for example in solvents of the type mentioned above, and the remaining monomers and auxiliary agents may then be added separately or together at the reaction temperature.

The polymerization is generally carried out at atmospheric pressure, but pressures of up to 25 bar may be employed. The initiators are used in quantities of 0.05 to 15% by weight, based on the total quantity of monomers.

The initiators include known radical intiators, e.g., aliphatic azo compounds such as azodiisobutyric acid nitrile, azo-bis-2-methylvaleronitrile, 1,1'-azo-bis-1-cyclohexane nitrile and 2,2'-azo-bis-isobutyric acid alkyl esters; symmetrical diacyl peroxides such as acetyl, propionyl and butyryl peroxide, benzoyl peroxides substituted with bromine, nitro, methyl or methoxy groups, and lauryl peroxides; symmetrical peroxydicarbonates such as diethyl, diisopropyl, dicyclohexyl and dibenzoyl peroxydicarbonate; tert.-butyl-peroxy-2-ethylhexanoate; tert.-butyl perbenzoate; hydroperoxides such as tert.-butyl hydroperoxide and cumene hydroperoxide; dialkyl peroxides such as dicumyl peroxide; tert.-butyl cumyl peroxide and di-tert.-butyl peroxide.

Conventional regulators may be used in the process of preparation to regulate the molecular weight of the copolymers. Tert.-dodecylmercaptan, n-dodecylmercaptan and diisopropyl xanthogen disulphide are examples of such regulators. The regulators may be added in quantities of 0.1 to 10% by weight, based on the total quantity of monomers.

The solutions of copolymers obtained from copolymerization may be transferred without further working up to the evaporation or degasification process in which the solvent is removed, for example in an evaporation extruder t 120° to 160° C. under a vacuum of 100 to 300 mbar; the copolymers to be used according to the invention are obtained.

Component B) consists of at least one organic compound having at least two hydroxyl groups per molecule and a glass transition temperature, $T_g$, or a melting point within the range of 0° to 150° C., preferably 30° to 150° C. and more preferably 35° to 120° C. Preferred compounds used as component B) include those which have (on statistical average) from 2 to 50, preferably 2 to 10 and more preferably 2 to 6 hydroxyl groups per molecule.

Compounds having a glass transition temperature below 30° C. or a melting point below 30° C. as well as compounds which are liquid at room temperature may be used when combined with high melting copolymers A) to form compositions AB which are solid at temperatures above 30° C. These compositions are preferably prepared using extruders or kneaders and can be converted into powders even when liquid components B) are used.

The compounds used as component B) include compounds having a number average molecular weight ($M_n$) above 261, preferably 262 to 15,000 and more preferably 262 to 1000, and which conform to the above-mentioned conditions concerning the melting points and hydroxyl group content. Examples include hydroxy functional acrylic copolymers, hydroxy functional polyethers, hydroxy functional polyesters, optionally urea-modified hydroxy functional polyurethanes, hydroxy functional polyureas, hydroxy functional polycarbonates and mixtures of such hydroxy functional compounds.

Suitable compounds include hydroxyl group-containing polyureas obtained by reacting diisocyanates such as 1-isocyanato-3-isocyanatomethyl-3,5,5-trimethyl cyclohexane (IPDI) with amino alcohols such as 2-aminoethanol or 1-amino-2-propanol in a molar ratio of 1:2; polyether polyols such as the reaction product of 1 mole of bisphenol A and 2 moles of propylene oxide; urea group-containing polyurethanes such as the reaction product of 2 moles of IPDI with 1 mole of a diol such as hexane-1,6-diol and 2 moles of an amino alcohol such as 1-amino-2-propanol; hydroxyl group-containing polyurethanes such as the reaction product of 1 mole of 1-amino-3-aminomethyl-3,5,5-trimethylcyclohexane (IPDA) with 2 moles of propylene carbonate or 2 moles of ethylene carbonate; copolymers of olefinically unsaturated compounds prepared by the reaction of hydroxyl group-containing monomers such as 2-hydroxyethyl-, 2-hydroxypropyl- or 2-hydroxybutyl(meth)-acrylate with comonomers which are free from functional groups, such as those previously set forth, using a method of preparation substantially analogous to that described above for the preparation of component A).

Additional preferred polyol components B) are low molecular weight polyhydroxyl compounds having a molecular weight of 104 to 261 containing from 2 to 6 hydroxyl groups per molecule. Examples include 1,6-hexanediol,1,7-heptanediol1,2- and 1,8-octanediol-diol, 1,2- and 1,10-decanediol,2,2-bis-(4-hydroxycyclohexyl)-propane, 1,1,1-tris-(hydroxymethyl)-propane, N,N',N''-tris-(2-hydroxyethyl)-isocyanurate (THEIC), 2,2-bis-(hydroxy-methyl) -1,3-propanediol, cis-1,2-bis-(hydroxymethyl)-cyclohexane, 4,4-bis-(hydroxymethyl)-cyclohexane, 2,5-bis-(hydroxy-methyl)-furan, 2,2'-bis-(hydroxymethyl)-biphenyl, bis-(hydroxy-ethyl)-malonic acid diethylester, 2,2-bis-(hydroxymethyl)-5norbornene, 2-methyl-2-propyl-1,3-propanediol, 1,4-cyclohexanediol and 2,2-dimethyl-1,3-propanediol.

Components C) which may optionally be present in the powder coating compositions according to the invention include the known auxiliary agents and additives used in powder lacquer technology, e.g., pigments such as titanium dioxide; levelling agents such as silicone compounds; and catalysts.

Although the powder lacquers may be stoved without accelerating agents, catalysts which catalyze the reaction between hydroxyl groups and carboxylic acid anhydride groups and//or epoxide groups and carboxylic acid groups may be used to reduce the stoving time and/or stoving temperature. Examples of suitable catalysts include compounds containing tertiary amino groups, such as 1,4-diaza-bicyclo-(2.2.2)-octane, 1,8-diazabicyclo-(5.4.0)-undec-7-ene, 1,5-diazabicyclo-(4.3.0)-non-5-ene, 1,2-dimorpholino-ethane and 1,3,5-tricyclohexyl hexahydro-1,3,5-triazine; salts based on compounds containing tertiary amino groups and quaternary ammonium groups such as (2-hydroxyethyl)-trimethylammonium chloride, triethylamine hydrochloride, tetrabutylammonium chloride, tetraethylammonium bromide, tetrahexylammonium chloride and tetramethylammonium chloride; organic tin compounds such as tin dioctoate, dibutyl tin laurate, dibutyl tin diacetate and dibutyl tin dichloride; and phosphorus compounds such as triphenyl phosphine.

The pulverulent coating compositions may be prepared by various methods. For example, the individual components A), B) and optionally C) may simply be mixed together as powders. It is preferable, however, to homogenize the solvent-free copolymers A), the solvent-free polyhydroxyl compounds B) and the optionally used additives C) in the molten state in extruders or kneaders at temperatures preferably from 100 to 120° C. The solidified product is ground and sieved to remove particles larger than the desired particle size, for example, particles above 0.1 mm. No significant reaction takes place at this time between the individual components when this method is employed for preparing the powder coating compositions. It is also possible in principle to prepare "mixed powders" AB from components A) and B) by the above mentioned method and then to add the optional auxiliary agents and additives in a further mixing process.

The nature and quantitative ratios of components A) and B) are preferably chosen to provide 0.2 to 4, preferably 0.5 to 2 hydroxyl groups from component B) and 0.1 to 8, preferably 0.2 to 4 and more preferably 0.4 to 1.5 epoxide groups from component A) for each acid anhydride group of component A).

The pulverulent coating compositions may be applied to heat resistant substrates by conventional powder application processes, e.g., electrostatic powder spraying or whirl sintering. The coatings may be cured by heating to temperatures of 120° to 220° C., preferably 130° to 200° C. Hard, glossy, solvent-resistant coatings having excellent corrosion protective properties and good color stability in the presence of heat are obtained. According to the invention the coating compositions may be used to coat any heat resistant substrates such as glass, plastics and metals.

The parts and percentages given in the following examples are parts by weight and percentages by weight unless otherwise indicated.

I General method of preparation for copolymers $A_1$ to $A_4$ containing carboxylic acid anhydride and epoxide groups and copolymers $B_1$ and $B_2$ containing hydroxyl groups.

Part I was introduced into a 25-liter pressurized steel reactor equipped with stirrer and cooling and heating devices and the contents were heated to the reaction temperature. Part II (added over a total period of 3 hours) and Part III (added over a total period of 3.5 hours) were then added in parallel. Stirring was continued for one hour at the given temperature.

The polymer solutions obtained were completely freed from solvent in a commercially available evaporation extruder at a temperature of about 150° C., a dwell time of about 2 minutes and a vacuum of about 260 mbar and then cooled and granulated.

The reaction temperatures and the compositions of Parts I to III are set forth in Table I together with the properties of the copolymers obtained. The corresponding data for the hydroxyl group-containing copolymers $B_1$ and $B_2$ are set forth in Table II.

TABLE I

| Copolymers | Copolymers containing anhydride and epoxide groups (quantities in g) | | | |
|---|---|---|---|---|
| | $A_1$ | $A_2$ | $A_3$ | $A_4$ |
| Part I | | | | |
| Toluene | 9000 | 9000 | 9000 | 9000 |
| Part II | | | | |
| Methyl methacrylate | 3915 | 3915 | 3915 | 3915 |
| n-butyl methacrylate | 1470 | 1715 | | |
| n-butyl acrylate | | | 2445 | 2200 |
| Styrene | 1955 | 1955 | 1470 | 1715 |
| Glycidyl methacrylate | 980 | 735 | 735 | 735 |
| Maleic acid anhydride | 1470 | 1470 | 1225 | 1225 |
| Part III | | | | |
| tert.-butylperoxy-2-ethyl hexanoate (70% in isododecane) | 580 | 580 | 580 | 580 |
| Toluene | 630 | 630 | 630 | 630 |
| Polymerization temperature (°C.) | 110 | 110 | 110 | 130 |
| Solids content (%) | 50.4 | 50.6 | 50.4 | 49.9 |
| Viscosity at 23° C. (mPa.s) | 13260 | 14960 | 1090 | 550 |
| Glass transition temperature of the solid resin ($T_g$, °C.) | 83.4 | 84.1 | 61.8 | 58.9 |

TABLE II

| Copolymers | Copolymers containing hydroxyl groups (quantities in g) | |
|---|---|---|
| | $B_1$ | $B_2$ |
| Part I | | |
| Toluene | 9000 | 9000 |
| Part II | | |
| Methyl methacrylate | 3660 | 4325 |
| n-butylmethacrylate | 2375 | 2690 |
| Styrene | 1870 | 1260 |
| Hydroxyethyl methacrylate | 1890 | 1420 |
| Acrylic acid | 100 | 100 |
| Part III | | |
| tert.-Butylperoxy-2-ethyl-hexanoate (70% in isododecane) | 440 | 580 |
| Toluene | 665 | 625 |
| Polymerization temperature (°C.) | 125 | 110 |
| Solids content (%) | 50.5 | 51.0 |
| Viscosity at 23° C. (mPa.s) | 2365 | 1750 |
| Glass transition temperature of solid resin ($T_g$, °C.) | 68 | 61 |
| OH number of solid resin (mg KOH/g) | 80 | 60 |

II. Preparation of a urea group- and urethane group-containing polyol cross-linking agent $B_3$ 444 g of 1-isocyanato-3-isocyanatomethyl-3,5,5-trimethyl-cyclohexane, 168.5 g of acetone and 0.2 g of digutyl tin dilaurate were introduced into a 2-liter four-necked flask equipped with stirrer, reflux condenser and two dropping funnels. the mixture was heated to 60° C. with stirring under a nitrogen atmosphere. A solution of 118 g of hexanediol-(1,6) in 168.5 g of acetone was then added dropwise within 2 hours at 60° C. and the reaction mixture was stirred at 60° C. until the isocyanate content of the reaction mixture was about 9.3%. The mixture was then introduced into a dropping funnel and added dropwise at 20° C. within one hour to 150 g of 1-amino-2-propanol contained in a 2-liter three-necked flask equipped with stirrer, reflux condenser and dropping funnel. Stirring was continued until the isocyanate content of the reaction mixture was <0.1%. The solvent was then distilled off as completely as possible under vacuum and the product was dried to constant weight in a vacuum drying cupboard at 80° C. and 15 mbar. A colorless solid having an OH content of 4.5% and a glass transition temperature, $T_g$ (DTA) of 67° C. was obtained.

III. Preparation of a powder coating composition according to the invention

Copolymers $A_1$ to $A_4$ were each melted and homogenized with a polyol cross-linking agent B) and other auxiliary agents and additives C) in a commercially available extruder. When the melt discharged from the apparatus had solidified, the product was ground and sieved to remove particles having a diameter larger than 0.1 mm and then applied to test sheets by means of an electrostatic spray device and cured at 140° C. for 30 minutes.

The solvent resistance of the lacquer films, which were about 50 μm in thickness, was tested by a rubbing test using a wad of cotton wool soaked in acetone. The result was given in the number of double rubs which could be applied without visible change to the lacquer film. Not more than 50 double rubs per film were carried out.

Table III set forth the formulations in percentages by weight and the solvent resistance as the degree of cross-linking.

pared from olefinically unsaturated compounds, has a weight average molecular weight of 1500 to 75,000 and contains in chemically bound form
(i) 1 to 30% by weight of cyclic carboxylic acid anhydride groups (calculated as $C_4H_2O_3$) and
(ii) 0.3 to 10% by weight of epoxide groups (calculated as $C_2H_3O$), and B) 1 to 90 parts by weight a polyol component containing at least one organic polyol having at least two hydroxyl groups per molecule, provided that if said polyol component contains a acrylic copolymer, said acrylic copolymer is prepared from olefinically unsaturated monomers consisting essentially of the reaction product of hydroxyl group-containing monomers with comonomers which are free from functional groups, and provided that for every anhydride group of component A) there are 0.1 to 10 hydroxyl group of component B).

2. The coating composition of claim 1 wherein component A) comprises the reaction product of
a) 1 to 30 parts by weight of copolymerized monomers containing anhydride groups,
b) 1 to 66 parts by weight of copolymerized monomers containing epoxide groups and
c) 4 to 98 parts by weight of copolymerized non-functional monomers which are free from anhydride groups and epoxide groups.

3. The coating composition of claim 2 wherein monomer a) comprises maleic anhydride and/or itaconic anhydride.

4. The coating composition of claim 2 wherein monomer b) comprises glycidyl acrylate, glycidyl methacrylate and/or allyl glycidyl ether.

5. The coating composition of claim 3 wherein monomer b) comprises glycidyl acrylate, glycidyl methacrylate and/or allyl glycidyl ether.

6. The coating composition claim 1 wherein said organic polyol of component B) has a number average

TABLE III

| | Formulations of the powder coating compostions according to the invention in percent by weight | | | | | | | | | |
|---|---|---|---|---|---|---|---|---|---|---|
| Formulation | 1 | 2 | 3 | 4 | 5 | 6 | 7 | 8 | 9 | 10 |
| Copolymer A) | 61.3 $A_1$ | 62.5 $A_3$ | 58.7 $A_2$ | 62.5 $A_4$ | 34.2 $A_1$ | 29.2 $A_2$ | 47.3 $A_3$ | 29.0 $A_4$ | 88.0 $A_2$ | 63.8 $A_1$ |
| Copolymer B) | | | | | 35.1 $B_1$ | 40.1 $B_2$ | | | | |
| Polyol cross-linking agent $B_3$ | | | | | | | 22 | | | 35.5 |
| Crelan U 502[1] | | | | | | | | 40.3 | | |
| THEIC[2] | 8.0 | 6.8 | | 6.8 | | | | | 11.3 | |
| 2,2-bis-(4-hydroxy-cyclohexyl)-propane | | | 10.6 | | | | | | | |
| Modaflow P III[3] | 0.7 | 0.7 | 0.7 | 0.7 | 0.7 | 0.7 | 0.7 | 0.7 | 0.7 | 0.7 |
| Titanium dioxide | 30.0 | 30.0 | 30.0 | 30.0 | 30.0 | 30.0 | 30.0 | 30.0 | | |
| Acetone rubbing test (number of double rubs) | 50 | 50 | 42 | 48 | 50 | 50 | 46 | 50 | 50 | 50 |

[1] an OH functional polyester having a hydroxyl content of about 1.5%, available from Bayer AG
[2] N,N',N"-tris-(2-hydroxyethyl)-isocyanurate
[3] a levelling agent available from Monsanto Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition in pulverulent form which is solid below 30° C. and liquid above 50° C. and comprises
A) 10 to 99 parts by weight of copolymer component containing at least one copolymer which is premolecular weight of greater than 261 and comprises a member selected from the group consisting of acrylic copolymers, polyethers, polyesters, urea-modified polyurethanes, polyurethanes, polyureas and polycarbonates.

7. The coating composition of claim 2 wherein said organic polyol of component B) has a number average molecular weight of greater than 261 and comprises a member selected from the group consisting of acrylic copolymers, polyethers, polyesters, urea-modified polyurethanes, polyurethanes, polyureas and polycarbonates.

8. The coating composition of claim 5 wherein said organic polyol of component B) has a number average molecular weigh of greater than 261 and comprises a member selected from eh group consisting of acrylic copolymers, polyethers, polyesters, urea-modified polyurethanes, polyurethanes, polyureas and polycarbonates.

9. The coating composition of claim 1 wherein component B) comprises an organic polyol having a molecular weight of 104 to 261 and containing 2 to 6 hydroxyl groups per molecule.

10. The coating composition of claim 2 herein component B) comprises an organic polyol having a molecular weight of 104 to 261 and containing 2 to 6 hydroxyl groups per molecule.

11. The coating composition of claim 5 wherein component B) comprises an organic polyol having a molecular weight of 104 to 261 and containing 2 to 6 hydroxyl group per molecule.

* * * * *